(12) United States Patent
Nguyen

(10) Patent No.: US 7,211,547 B2
(45) Date of Patent: May 1, 2007

(54) RESIN COMPOSITIONS AND METHODS OF USING SUCH RESIN COMPOSITIONS IN SUBTERRANEAN APPLICATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 420 days.

(21) Appl. No.: 10/791,944

(22) Filed: Mar. 3, 2004

(65) Prior Publication Data

US 2005/0197258 A1 Sep. 8, 2005

(51) Int. Cl.
*C09K 8/82* (2006.01)
*C09K 8/502* (2006.01)

(52) U.S. Cl. .............. 507/202; 507/219; 507/220; 166/276; 166/295

(58) Field of Classification Search ........... 507/202, 507/219, 220; 166/276, 295
See application file for complete search history.

(56) References Cited

U.S. PATENT DOCUMENTS

| 2,238,671 | A | 4/1941 | Woodhouse ............... 166/21 |
|---|---|---|---|
| 2,703,316 | A | 3/1955 | Schneider ............... 260/78.3 |
| 2,869,642 | A | 1/1959 | McKay et al. |
| 3,047,067 | A | 7/1962 | Williams et al. ........... 166/33 |
| 3,123,138 | A | 3/1964 | Robichaux ............... 166/33 |
| 3,176,768 | A | 4/1965 | Brandt et al. ............. 166/33 |
| 3,199,590 | A | 8/1965 | Young ..................... 166/33 |
| 3,272,650 | A | 9/1966 | MacVittie ................. 134/7 |
| 3,297,086 | A | 1/1967 | Spain ....................... 166/33 |
| 3,308,885 | A | 3/1967 | Sandiford ................. 166/33 |
| 3,316,965 | A | 5/1967 | Watanabe ................. 166/33 |
| 3,375,872 | A | 4/1968 | McLaughlin et al. ........ 166/29 |
| 3,404,735 | A | 10/1968 | Young et al. ............. 166/33 |
| 3,415,320 | A | 12/1968 | Young ..................... 166/33 |
| 3,492,147 | A | 1/1970 | Young et al. ............ 117/62.2 |
| 3,659,651 | A | 5/1972 | Graham ................... 166/280 |
| 3,681,287 | A | 8/1972 | Brown et al. ............. 260/67 |
| 3,754,598 | A | 8/1973 | Holloway, Jr. ........... 166/249 |
| 3,765,804 | A | 10/1973 | Brandon ................. 417/540 |
| 3,768,564 | A | 10/1973 | Knox et al. ............. 166/307 |
| 3,784,585 | A | 1/1974 | Schmitt et al. ........... 260/861 |
| 3,819,525 | A | 6/1974 | Hattenbrun ............... 252/132 |
| 3,828,854 | A | 8/1974 | Templeton et al. ........ 166/307 |
| 3,842,911 | A | 10/1974 | Know et al. ............. 166/307 |
| 3,854,533 | A | 12/1974 | Gurley et al. ............ 166/276 |
| 3,857,444 | A | 12/1974 | Copeland ................ 166/276 |
| 3,863,709 | A | 2/1975 | Fitch ....................... 165/1 |
| 3,868,998 | A | 3/1975 | Lybarger et al. .......... 166/278 |
| 3,888,311 | A | 6/1975 | Cooke, Jr. ................ 166/280 |
| 3,912,692 | A | 10/1975 | Casey et al. ............. 260/78.3 |
| 3,948,672 | A | 4/1976 | Harnberger ............... 106/90 |
| 3,955,993 | A | 5/1976 | Curtice ................... 106/90 |
| 3,960,736 | A | 6/1976 | Free et al. ............. 252/8.55 R |
| 4,008,763 | A | 2/1977 | Lowe ..................... 166/253 |
| 4,015,995 | A | 4/1977 | Hess ..................... 106/287 |
| 4,029,148 | A | 6/1977 | Emery ................... 166/250.1 |
| 4,031,958 | A | 6/1977 | Sandiford et al. ........ 166/270 |
| 4,042,032 | A | 8/1977 | Anderson et al. ......... 166/276 |
| 4,070,865 | A | 1/1978 | McLaughlin ............... 61/36 |
| 4,074,760 | A | 2/1978 | Copeland et al. .......... 166/276 |
| 4,085,801 | A | 4/1978 | Sifferman ................ 166/295 |
| 4,127,173 | A | 11/1978 | Watkins et al. ........... 166/276 |
| 4,169,798 | A | 10/1979 | DeMartino ............. 252/8.55 R |
| 4,172,066 | A | 10/1979 | Zweigle et al. ......... 260/29.6 TA |
| 4,245,702 | A | 1/1981 | Haafkens et al. .......... 166/307 |
| 4,273,187 | A | 6/1981 | Satter et al. ............. 166/250 |
| 4,291,766 | A | 9/1981 | Davies et al. ............ 166/276 |
| 4,305,463 | A | 12/1981 | Zakiewicz ............... 106/245 |
| 4,336,842 | A | 6/1982 | Graham et al. ........... 166/276 |
| 4,352,674 | A | 10/1982 | Fery ....................... 23/230 |
| 4,353,806 | A | 10/1982 | Canter et al. ............ 507/229 |
| 4,387,769 | A | 6/1983 | Erbstoesser et al. ....... 166/295 |
| 4,415,805 | A | 11/1983 | Fertl et al. ............... 250/260 |

(Continued)

FOREIGN PATENT DOCUMENTS

CA 2063877 5/2003

(Continued)

OTHER PUBLICATIONS

S. W. Almond, et al., "*Factors Affecting Proppant Flowback With Resin Coated Proppants*," Society of Petroleum Engineers, Inc., SPE 30096, p. 171-186, 1995.

(Continued)

*Primary Examiner*—Philip C. Tucker
(74) *Attorney, Agent, or Firm*—Robert A. Kent; Baker Botts

(57) ABSTRACT

The present invention relates to curable, permeable resin compositions and methods of using such compositions. One embodiment of provides a method of creating a resin mass comprising the steps of combining a resin, a hardening agent, a hydrocarbon diluent, a silane coupling agent, a foaming agent, a compressible gas, and a degradable material to form a resin composition; placing the resin composition in a subterranean formation; and, allowing the resin to substantially cure and the degradable material to substantially degrade so as to form a permeable, hardened resin mass. Another embodiment of the present invention provides a resin composition useful in subterranean applications comprising a resin, a hardening agent, a hydrocarbon diluent, a silane coupling agent, a foaming agent, a compressible gas, and a degradable material.

36 Claims, No Drawings

U.S. PATENT DOCUMENTS

| | | | |
|---|---|---|---|
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/280 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/276 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,368,102 A * | 11/1994 | Dewprashad et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/212 |
| 5,604,184 A | 2/1997 | Ellis et al. | 507/117 |
| 5,604,186 A | 2/1997 | Hunt et al. | 507/204 |
| 5,609,207 A * | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |

| | | | |
|---|---|---|---|
| 5,712,314 A | 1/1998 | Surles et al. .................... 521/41 |
| 5,732,364 A | 3/1998 | Kalb et al. ...................... 588/8 |
| 5,765,642 A | 6/1998 | Surjaatmadja ................. 166/297 |
| 5,775,425 A | 7/1998 | Weaver et al. ................ 166/276 |
| 5,782,300 A | 7/1998 | James et al. .................. 166/278 |
| 5,783,822 A | 7/1998 | Buchanan et al. ............. 250/259 |
| 5,787,986 A | 8/1998 | Weaver et al. ................ 166/280 |
| 5,791,415 A | 8/1998 | Nguyen et al. ................ 166/280 |
| 5,799,734 A | 9/1998 | Norman et al. ................ 166/278 |
| 5,806,593 A | 9/1998 | Suries .......................... 166/270 |
| 5,830,987 A | 11/1998 | Smith ............................ 528/332 |
| 5,833,000 A | 11/1998 | Weaver et al. ................ 166/276 |
| 5,833,361 A | 11/1998 | Funk ............................. 366/80 |
| 5,836,391 A | 11/1998 | Jonasson et al. .............. 166/295 |
| 5,836,392 A | 11/1998 | Urlwin-Smith ............... 166/295 |
| 5,837,656 A | 11/1998 | Sinclair et al. ................. 507/220 |
| 5,837,785 A | 11/1998 | Kinsho et al. ................. 525/527 |
| 5,839,510 A | 11/1998 | Weaver et al. ................ 166/276 |
| 5,840,784 A | 11/1998 | Funkhouser et al. .......... 523/130 |
| 5,849,401 A | 12/1998 | El-Afandi et al. ............. 428/215 |
| 5,849,590 A | 12/1998 | Anderson, II et al. .......... 436/27 |
| 5,853,048 A | 12/1998 | Weaver et al. ................ 166/279 |
| 5,864,003 A | 1/1999 | Qureshi et al. ................ 528/141 |
| 5,865,936 A | 2/1999 | Edelman et al. ............... 156/310 |
| 5,871,049 A | 2/1999 | Weaver et al. ................ 166/276 |
| 5,873,413 A | 2/1999 | Chatterji et al. ............... 166/293 |
| 5,875,844 A | 3/1999 | Chatterji et al. ............... 166/293 |
| 5,875,845 A | 3/1999 | Chatterji et al. ............... 166/293 |
| 5,875,846 A | 3/1999 | Chatterji et al. ............... 166/293 |
| 5,893,383 A | 4/1999 | Fracteau ........................ 137/14 |
| 5,893,416 A | 4/1999 | Read ............................. 166/304 |
| 5,908,073 A | 6/1999 | Nguyen et al. ................ 166/276 |
| 5,911,282 A | 6/1999 | Onan et al. .................... 175/72 |
| 5,916,933 A | 6/1999 | Johnson et al. ................ 523/208 |
| 5,921,317 A | 7/1999 | Dewprashad et al. ......... 166/208 |
| 5,924,488 A | 7/1999 | Nguyen et al. ................ 166/280 |
| 5,929,437 A | 7/1999 | Elliott et al. ................... 250/259 |
| 5,944,105 A | 8/1999 | Nguyen ......................... 166/278 |
| 5,945,387 A | 8/1999 | Chatterji et al. ............... 507/224 |
| 5,948,734 A | 9/1999 | Sinclair et al. ................. 507/219 |
| 5,957,204 A | 9/1999 | Chatterji et al. ............... 166/295 |
| 5,960,877 A | 10/1999 | Funkhouser et al. .......... 166/270 |
| 5,960,880 A | 10/1999 | Nguyen et al. ................ 166/280 |
| 5,964,291 A | 10/1999 | Bourne et al. ................. 166/279 |
| 5,969,006 A | 10/1999 | Onan et al. .................... 523/166 |
| 5,977,283 A | 11/1999 | Rossitto ......................... 528/44 |
| 5,994,785 A | 11/1999 | Higuchi et al. ................ 527/789 |
| RE36,466 E | 12/1999 | Nelson et al. .................. 166/280 |
| 6,003,600 A | 12/1999 | Nguyen et al. ................ 166/281 |
| 6,004,400 A | 12/1999 | Bishop et al. .................. 134/2 |
| 6,006,835 A | 12/1999 | Onan et al. .................... 166/276 |
| 6,006,836 A | 12/1999 | Chatterji et al. ............... 166/295 |
| 6,012,524 A | 1/2000 | Chatterji et al. ............... 166/295 |
| 6,016,870 A | 1/2000 | Dewprashad et al. ......... 166/295 |
| 6,024,170 A | 2/2000 | McCabe et al. ............... 166/300 |
| 6,028,113 A | 2/2000 | Scepanski ...................... 514/643 |
| 6,028,534 A | 2/2000 | Ciglenec et al. ............... 340/856.2 |
| 6,040,398 A | 3/2000 | Kinsho et al. ................. 525/527 |
| 6,047,772 A | 4/2000 | Weaver et al. ................ 166/276 |
| 6,059,034 A | 5/2000 | Rickards et al. ............... 166/280 |
| 6,059,035 A | 5/2000 | Chatterji et al. ............... 166/293 |
| 6,059,036 A | 5/2000 | Chatterji et al. ............... 166/294 |
| 6,068,055 A | 5/2000 | Chatterji et al. ............... 166/293 |
| 6,069,117 A | 5/2000 | Onan et al. .................... 507/202 |
| 6,074,739 A | 6/2000 | Katagiri ......................... 428/323 |
| 6,079,492 A | 6/2000 | Hoogteijling et al. ......... 166/276 |
| 6,098,711 A | 8/2000 | Chatterji et al. ............... 166/294 |
| 6,114,410 A | 9/2000 | Betzold .......................... 523/130 |
| 6,123,871 A | 9/2000 | Carroll ........................... 252/301.36 |
| 6,123,965 A | 9/2000 | Jacon et al. .................... 424/489 |
| 6,124,246 A | 9/2000 | Heathman et al. ............. 507/219 |
| 6,130,286 A | 10/2000 | Thomas et al. ................ 524/507 |
| 6,135,987 A | 10/2000 | Tsai et al. ...................... 604/365 |
| 6,140,446 A | 10/2000 | Fujiki et al. ................... 528/15 |
| 6,148,911 A | 11/2000 | Gipson et al. ................. 166/248 |
| 6,152,234 A | 11/2000 | Newhouse et al. ............ 166/403 |
| 6,162,766 A | 12/2000 | Muir et al. ..................... 507/267 |
| 6,169,058 B1 | 1/2001 | Le et al. ........................ 507/222 |
| 6,172,011 B1 | 1/2001 | Card et al. ..................... 507/204 |
| 6,172,077 B1 | 1/2001 | Curtis et al. ................... 514/278 |
| 6,176,315 B1 | 1/2001 | Reddy et al. .................. 166/295 |
| 6,177,484 B1 | 1/2001 | Surles ............................ 523/131 |
| 6,184,311 B1 | 2/2001 | O'Keefe et al. ............... 525/438 |
| 6,187,834 B1 | 2/2001 | Thayer et al. .................. 522/15 |
| 6,187,839 B1 | 2/2001 | Eoff et al. ...................... 523/130 |
| 6,189,615 B1 | 2/2001 | Sydansk ........................ 166/270 |
| 6,192,985 B1 | 2/2001 | Hinkel et al. .................. 166/280 |
| 6,192,986 B1 | 2/2001 | Urlwin-Smith ............... 166/295 |
| 6,196,317 B1 | 3/2001 | Hardy ............................ 166/295 |
| 6,202,751 B1 | 3/2001 | Chatterji et al. ............... 166/276 |
| 6,209,643 B1 | 4/2001 | Nguyen et al. ................ 166/276 |
| 6,209,644 B1 | 4/2001 | Brunet ........................... 166/297 |
| 6,209,646 B1 | 4/2001 | Reddy et al. .................. 166/300 |
| 6,210,471 B1 | 4/2001 | Craig ............................. 106/31.08 |
| 6,214,773 B1 | 4/2001 | Harris et al. ................... 507/271 |
| 6,231,644 B1 | 5/2001 | Chatterji ........................ 166/249 |
| 6,234,251 B1 | 5/2001 | Chatterji et al. ............... 166/295 |
| 6,238,597 B1 | 5/2001 | Yim et al. ...................... 252/512 |
| 6,241,019 B1 | 6/2001 | Davidson et al. ............. 106/724 |
| 6,242,390 B1 | 6/2001 | Mitchell et al. ............... 507/211 |
| 6,244,344 B1 | 6/2001 | Chatterji et al. ............... 166/295 |
| 6,257,335 B1 | 7/2001 | Nguyen et al. ................ 166/280.1 |
| 6,260,622 B1 | 7/2001 | Blok et al. ..................... 166/305.1 |
| 6,271,181 B1 | 8/2001 | Chatterji et al. ............... 507/219 |
| 6,274,650 B1 | 8/2001 | Cui ................................ 523/457 |
| 6,279,652 B1 | 8/2001 | Chatterji et al. ............... 166/194 |
| 6,279,656 B1 | 8/2001 | Sinclair et al. ................. 166/310 |
| 6,283,214 B1 | 9/2001 | Guinot et al. .................. 166/297 |
| 6,302,207 B1 | 10/2001 | Nguyen et al. ................ 166/276 |
| 6,306,998 B1 | 10/2001 | Kimura et al. ................. 528/12 |
| 6,311,773 B1 | 11/2001 | Todd et al. ..................... 166/280 |
| 6,321,841 B1 | 11/2001 | Eoff et al. ...................... 166/291 |
| 6,323,307 B1 | 11/2001 | Bigg et al. ..................... 528/354 |
| 6,326,458 B1 | 12/2001 | Gruber et al. ................. 528/354 |
| 6,328,105 B1 | 12/2001 | Betzold ......................... 166/280 |
| 6,328,106 B1 | 12/2001 | Griffith et al. ................. 166/295 |
| 6,330,916 B1 | 12/2001 | Rickards et al. ............... 166/280 |
| 6,330,917 B2 | 12/2001 | Chatterji et al. ............... 166/295 |
| 6,350,309 B2 | 2/2002 | Chatterji et al. ............... 106/677 |
| 6,357,527 B1 | 3/2002 | Norman et al. ................ 166/300 |
| 6,364,018 B1 | 4/2002 | Brannon et al. ............... 166/280.2 |
| 6,364,945 B1 | 4/2002 | Chatterji et al. ............... 106/677 |
| 6,367,165 B1 | 4/2002 | Huttlin .......................... 34/582 |
| 6,367,549 B1 | 4/2002 | Chatterji et al. ............... 166/292 |
| 6,372,678 B1 | 4/2002 | Youngsman et al. .......... 504/128 |
| 6,376,571 B1 | 4/2002 | Chawla et al. ................. 522/64 |
| 6,387,986 B1 | 5/2002 | Moradi-Araghi et al. ..... 523/211 |
| 6,390,195 B1 | 5/2002 | Nguyen et al. ................ 166/276 |
| 6,401,817 B1 | 6/2002 | Griffith et al. ................. 166/295 |
| 6,405,797 B2 | 6/2002 | Davidson et al. ............. 166/249 |
| 6,406,789 B1 | 6/2002 | McDaniel et al. ............. 428/403 |
| 6,408,943 B1 | 6/2002 | Schultz et al. ................. 166/285 |
| 6,422,314 B1 | 7/2002 | Todd et al. ..................... 166/312 |
| 6,439,309 B1 | 8/2002 | Matherly et al. .............. 166/276 |
| 6,439,310 B1 | 8/2002 | Scott, III et al. ............... 166/308 |
| 6,440,255 B1 | 8/2002 | Kohlhammer et al. ........ 156/283 |
| 6,446,727 B1 | 9/2002 | Zemlak et al. ................. 166/308 |
| 6,448,206 B1 | 9/2002 | Griffith et al. ................. 507/219 |
| 6,450,260 B1 | 9/2002 | James et al. ................... 166/277 |
| 6,454,003 B1 | 9/2002 | Chang et al. .................. 166/270 |
| 6,458,885 B1 | 10/2002 | Stengal et al. ................. 524/507 |
| 6,485,947 B1 | 11/2002 | Rajgarhia et al. ............. 435/139 |
| 6,488,091 B1 | 12/2002 | Weaver et al. ................ 166/300 |
| 6,488,763 B2 | 12/2002 | Brothers et al. ............... 106/692 |
| 6,494,263 B2 | 12/2002 | Todd ............................. 166/312 |
| 6,503,870 B2 | 1/2003 | Griffith et al. ................. 507/219 |

| Patent No. | Date | Inventor | Class |
|---|---|---|---|
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nyguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194960 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen et al. | 166/281 |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

International Search Report, PCT/GB2005/00 637, corresponding to U.S. Appl. No. 10/791,944, Jun. 2, 2005.

Halliburton, *CoalStim*[SM] *Service, Helps Boost Cash Flow From CBM Assets*, Stimulation, HO3679 Oct. 2003, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, 2004, Halliburton Communications.

Halliburton Technical Flier—*Multi Stage Frac Completion Methods*, 2 pages, no date available.

Halliburton "CobraFrac^SM Service, Coiled Tubing Fracturing—Cost-Effective Method for Stimulating Untapped Reserves", 2 pages, 2004.

Halliburton "CobraJetFrac^SM Service, Cost-Effective Technology That Can Help Reduce Cost per BOE Produced, Shorten Cycle time and Reduce Capex", no date available.

Halliburton Cobra Frac Advertisement, 2001.

Halliburton "SurgiFrac™ Service, a Quick and cost-Effective Method to Help Boost Production From Openhole Horizonal Completions", 2002.

CDX Gas, CDX Solution, 2003, CDX, LLC, Available @ www.cdxgas.com/solution.html, printed pp. 1-2.

CDX Gas, "What is Coalbed Methane?" CDX, LLC. Available @ www.cdxgas.com/what.html, printed p. 1, no date available.

Halliburton brochure entitled "H2Zero™ Service Introducing The Next Generation of cost-Effective Conformance Control Solutions", 2002.

Halliburton brochure entitled INJECTROL® A Component, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages, no date available.

Halliburton, SandWedge® NT Conductivity Enhancement System, Enhances Proppant Pack Conductivity and Helps Prevent Intrusion of Formation Material for Improved Long-Term Production, Stimulation, HO2289 May 2004, 2004, Halliburton Communications.

Almond et al., Factors Affecting Proppant Flowback With Resin Coated Proppants, SPE 30096, pp. 171-186, May 1995.

Nguyen et al., A Novel Approach For Enhancing Proppant Consolidation: Laboratory Testing And Field Applications, SPE Paper No. 77748, 2002.

SPE 15547, Field Application of Lignosulfonate Gels To Reduce Channeling, South Swan Hills Miscible Unit, Alberta, Canada, by O.R. Wagner et al, 1986.

Owens et al., Waterflood Pressure Pulsing for Fractured Reservoirs SPE 1123, 1966.

Felsenthal et al., Pressure Pulsing—An Improved Method of Waterflooding Fractured Reservoirs SPE 1788, 1957.

Raza, "Water and Gas Cyclic Pulsing Method for Improved Oil Recovery", SPE 3005, 1971.

Peng et al., "Pressure Pulsing Waterflooding in Dual Porosity Naturally Fractured Reservoirs"SPE 17587, 1988.

Dusseault et al, "Pressure Pulse Workovers in Heavy Oil", SPE 79033, 2002.

Yang et al., "Experimental Study on Fracture Initiation By Pressure Pulse", SPE 63035, 2000.

Nguyen et al., New Guidelines For Applying Curable Resin-Coated Proppants, SPE Paper No. 39582, 1997.

Kazakov et al., "Optimizing and Managing Coiled Tubing Frac Strings" SPE 60747, 2000.

Advances in Polymer Science, vol. 157, "Degradable Aliphatic Polyesters" edited by A.-C. Albertson, 2001.

Gorman, Plastic Electric: Lining up the Future of Conducting Polymers Science News, vol. 163, May 17, 2003.

Gidley et al., "Recent Advances in Hydraulic Fracturing," Chapter 6, pp. 109-130, 1989.

Simmons et al., "Poly(phenyllactide): Synthesis, Characterization, and Hydrolytic Degradation, Biomacromolecules", vol. 2, No. 2, pp. 658-663, 2001.

Yin et al., "Preparation and Characterization of Substituted Polylactides", Americal Chemical Society, vol. 32, No. 23, pp. 7711-7718, 1999.

Yin et al., "Synthesis and Properties of Polymers Derived from Substituted Lactic Acids", American Chemical Society, Ch.12, pp. 147-159, 2001.

Cantu et al., "Laboratory and Field Evaluation of a Combined Fluid-Loss Control Additive and Gel Breaker for Fracturing Fluids," SPE 18211, 1990.

Love et al., "Selectively Placing Many Fractures in Openhole Horizontal Wells Improves Production", SPE 50422, 1998.

McDaniel et al. "Evolving New Stimulation Process Proves Highly Effective In Level 1 Dual-Lateral Completion" SPE 78697, 2002.

Albertsson et al., "Aliphatic Polyesters: Synthesis, Properties and Applications", Advances in Polymer Science, vol. 57 Degradable Aliphatic Polyesters, 2002.

Dechy-Cabaret et al., "Controlled Ring-Operated Polymerization of Lactide and Glycolide" American Chemical Society, Chemical Reviews, A-Z, AA-AD, 2004.

Funkhouser et al., "Synthetic Polymer Fracturing Fluid For High-Temperature Applications", SPE 80236, 2003.

Chelating Agents, Encyclopedia of Chemical Technology, vol. 5 (764-795), no date available.

Vichaibun et al., "A New Assay for the Enzymatic Degradation of Polylactic Acid, Short Report", ScienceAsia, vol. 29, pp. 297-300, 2003.

* cited by examiner

RESIN COMPOSITIONS AND METHODS OF USING SUCH RESIN COMPOSITIONS IN SUBTERRANEAN APPLICATIONS

BACKGROUND

The present invention relates to resin compositions and methods of using such compositions in subterranean formations. More particularly, the present invention relates to curable, permeable resin compositions and methods of using such compositions, for example, to control particulate migration.

Hydrocarbon wells are often located in subterranean zones that contain unconsolidated particulates that may migrate out of the subterranean formation with the oil, gas, water, and/or other fluids produced by the wells. The presence of particulates, such as formation sand, in produced fluids is undesirable in that the particulates may abrade pumping and other producing equipment and reduce the fluid production capabilities of the producing zones. Unconsolidated subterranean zones include those that contain loose particulates, those wherein the bonded particulates have insufficient bond strength to withstand the forces produced by the production of fluids through the zones.

One method of controlling particulates in unconsolidated formations involves placing a filtration bed containing gravel near the well bore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a well bore. Such packs may be time consuming and expensive to install.

Another method used to control particulates in unconsolidated formations involves consolidating unconsolidated subterranean producing zones by applying a resin followed by a spacer fluid and then a catalyst. Such techniques, however, may be problematic when, for example, an insufficient amount of spacer fluid is used between the application of the resin and the application of the external catalyst. The resin may come into contact with the external catalyst in the well bore itself rather than in the unconsolidated subterranean producing zone, which may result in rapid polymerization, potentially damaging the formation by plugging the pore channels, halting pumping when the well bore is plugged with solid material, or resulting in a down hole explosion as a result of the exothermic heat generated by the polymerization. Also, using these conventional processes to treat long intervals of unconsolidated regions is not practical due to the difficulty in determining if the entire interval has been successfully treated with both the resin and the external catalyst.

SUMMARY OF THE INVENTION

The present invention relates to resin compositions and methods of using such compositions in subterranean formations. More particularly, the present invention relates to curable, permeable resin compositions and methods of using such compositions, for example, to control particulate migration.

One embodiment of the present invention provides a method of creating a resin mass comprising the steps of combining a resin, a hardening agent, a hydrocarbon diluent, a silane coupling agent, a foaming agent, a compressible gas, and a degradable material to form a resin composition; placing the resin composition in a subterranean formation; and, allowing the resin to substantially cure and the degradable material to substantially degrade so as to form a permeable, hardened resin mass.

Anther embodiment of the present invention provides a method of controlling the migration of particulates in a subterranean formation comprising the steps of isolating a zone in a subterranean formation; providing a resin composition comprising a resin, a hardening agent, a hydrocarbon diluent, a silane coupling agent, a foaming agent, a compressible gas, and a degradable material; placing the resin composition in at least a portion of the zone; and, allowing the resin to substantially cure and the degradable material to substantially degrade so as to form a permeable, hardened resin mass.

Another embodiment of the present invention provides a method of at least partially maintaining the integrity of a subterranean fracture comprising the steps of providing a resin composition comprising resin, a hardening agent, a hydrocarbon diluent, a silane coupling agent, a foaming agent, a compressible gas, and a degradable material; placing the resin composition into at least one fracture in a subterranean formation; and, allowing the resin to substantially cure and the degradable material to substantially degrade so as to form a permeable, hardened resin mass.

Another embodiment of the present invention provides a resin composition useful in subterranean applications comprising a resin, a hardening agent, a hydrocarbon diluent, a silane coupling agent, a foaming agent, a compressible gas, and a degradable material.

The features and advantages of the present invention will be readily apparent to those skilled in the art upon a reading of the description of the preferred embodiments that follows.

DESCRIPTION OF PREFERRED EMBODIMENTS

The present invention relates to resin compositions and methods of using such compositions in subterranean formations. More particularly, the present invention relates to curable, permeable resin compositions and methods of using such compositions, for example, to control particulate migration.

The resin compositions of the present invention comprise an epoxy resin; a hardening agent; a hydrocarbon diluent; a silane coupling agent; a foaming agent; a compressible gas; and, a degradable material. The resin compositions of the present invention may further comprise an optional filler material. Such resin compositions are capable of being placed in a zone of a subterranean formation, such as a fracture or a well bore, so as to form hardened, permeable masses capable of controlling particulate migration while not negatively impacting the production of desirable fluids. When a resin composition of the present invention is placed in or neighboring the desired zone, the resin hardens and the void spaces left by the compressible gas are further augmented when the degradable material degrades and creates additional voids within the hardened resin mass. These voids enhance the permeability of the hardened resin, which results, inter alia, in enhanced mass conductivity that may enhance well productivity. The resin compositions of the present invention provide the ability to form an in-situ porous medium capable of controlling formation fines and sands while allowing hydrocarbon production.

Resins suitable for use in the present invention are those resins that are capable of forming a hardened, consolidated mass. Suitable resins include, but are not limited to phenolic resins, furan/furfuryl alcohol resins, phenolic/latex resins, phenol formaldehyde resins, polyester resins and hybrids and copolymers thereof, polyurethane resins and hybrids and copolymers thereof, acrylate resin, and mixtures thereof. Preferred types of resin are epoxy resin systems. Epoxy resin systems generally contain an internal catalyst or activator so that when pumped down hole, they may be cured using only time and temperature where desired. The furan resin systems generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention.

The resin compositions of the present invention further comprise a hardening agent. Suitable hardening agents are those materials capable of aiding the selected resin to form a consolidated mass. Examples of the hardening agents that can be used include, but are not limited to, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. Selection of a suitable hardening agent depends, in part, on the resin chosen and the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris (dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. In some embodiments of the present invention, the hardening agent used may be included in the resin composition in the range of from about 40% to about 60% by weight of the resin in the resin composition.

The resin compositions of the present invention further comprise a hydrocarbon diluent containing one or more aromatic hydrocarbons. Suitable hydrocarbon diluents, inter alia, act to dilute the viscosity of the resin and such diluents are often chosen based on availability and cost concerns. Examples of suitable aromatic hydrocarbon diluents include, but are not limited to, toluene, ethylbenzene, n-propylbenzene; isopropylbenzene, n-butylbenzene, isobutylbenzene, cyclohexylbenzene, n-hexylbenzene, xylene, diethylbenzene, 2-chloro-p-xylene diisopropylbenzene, 2-nitro-p-xylene, cymene, durene, isodurene, trimethylbenzene, triethylbenzene, dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene, and mixtures thereof. In some embodiments of the present invention, the hydrocarbon diluent is included in the resin composition in the range of from about 20% to about 60% by weight of the resin in the resin composition. It is within the ability of one skilled in the art, with the benefit of this disclosure, to select a suitable diluent and a suitable percentage of diluent.

The resin compositions of the present invention further comprise a silane coupling agent that acts to help the resin bond to the degradable material (and filler, where used) in the resin composition. Examples of silane coupling agents that can be used in the resin compositions of the present invention include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof. The silane coupling agent chosen is included in the liquid hardening agent component in an amount capable of sufficiently bonding the resin to a particulate. In some embodiments of the present invention, the silane coupling agent used is included in the resin composition in the range of from about 0.01% to about 5% by weight of the resin in the resin composition.

The resin compositions of the present invention further comprise a foaming agent that comprises a fluorocarbon surfactant. Traditional foaming agents are incompatible with the resin component of the resin compositions of the present invention. However, it has been found that foaming agents comprising a fluorocarbon surfactant are suitable for forming a stable foam in the resin compositions of the present invention. Examples of suitable foaming agents comprising fluorocarbon surfactants include, but are not limited to, fluorinated alkyl alkoxylates, fluorinated alkyl esters, fluorinated aliphatic polymeric esters, and combinations thereof. Examples of suitable, commercially available foaming agents comprising a fluorocarbon surfactant include those sold by 3M Company of St. Paul, Minn. under the trade names "FC-730™," "FC-4430™," and "FC-4432™". In some embodiments of the present invention, the foaming agent is included in the resin composition in the range of from about 0.01% to about 5% by weight of the resin in the resin composition.

The resin compositions of the present invention further comprise a compressible gas. Any compressible gas that does not adversely react with or affect the other components of the resin composition may be used in accordance with the present invention. Suitable compressible gases include air, nitrogen, and combinations thereof. Carbon dioxide may be contraindicated based on the resin type selected. For example, where an epoxy resin is used, the acidity of a carbon dioxide compressible gas may prevent adequate curing of the resin. Similarly, where a furan resin is chosen, the acidity of the carbon dioxide may cause premature curing and potential safety concerns. One of ordinary skill in the art, with the benefit of this disclosure, will recognize situations wherein carbon dioxide is contraindicated. In some embodiments of the present invention, the compressible gas is included in the resin composition in an amount sufficient to produce a final resin composition density from about 6 to about 12 pounds per gallon (including filler material).

The resin compositions of the present invention further comprise a degradable material capable of undergoing an irreversible degradation down hole. In some embodiments of the present invention, the degradable material is included in the resin composition in the range of from about 1% to about 60% by weight of the resin in the resin composition. The amount of degradable material used should not be such that, when degraded, an undesirably high percentage of voids are present in the resin mass that potentially could make the resin mass too weak to maintain its character or allow the resin mass to crumble or degrade. One of ordinary skill in the art, with the benefit of this disclosure, will recognize an optimum concentration and shape of a degradable material that provides desirable values in terms of enhanced conductivity or permeability without undermining the stability of the resin mass itself.

The term "irreversible" as used herein means that the degradable material once degraded down hole, it should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical, thermal, radiation induced reaction.

Examples of degradable materials that may be used in conjunction with the present invention include but are not limited to materials that undergo hydrolysis in the presence of water (such as degradable polymers and dehydrated salts) and materials that degrade when subjected to the subterranean temperatures where the resin is being used (such as sodium acetate trihydrate). One of ordinary skill in the art with the benefit of this disclosure will be able to determine the appropriate degradable material to achieve the desired degradation time, result in the desired degradation by-products, and the like.

Suitable examples of degradable polymers that may be used in accordance with the present invention, include, but are not limited to, those described in the publication of Advances in Polymer Science, Vol. 157 entitled "Degradable Aliphatic Polyesters" edited by A.-C. Albertsson. Specific examples of suitable polymers include polysaccharides; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); polyphosphazenes; polyvinyl alcohols; poly ethylene oxides; poly(adipic anhydrides), poly(suberic anhydrides), poly(sebacic anhydrides), poly(dodecanedioic anhydrides), poly(maleic anhydrides), poly(benzoic anhydrides); and combinations thereof. Poly(lactides) are preferred degradable polymers for the compositions and methods of the present invention.

Suitable examples of dehydrated salts that may be used in conjunction with the present invention include, but are not limited to, particulate solid anhydrous borate materials. Specific examples of particulate solid anhydrous borate materials that may be used include but are not limited to anhydrous sodium tetraborate (also known as anhydrous borax), and anhydrous boric acid. Such anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Blends of degradable materials also are suitable for use in the present invention. One example of a suitable blend of materials is a mixture of poly(lactic acid) and sodium borate where the mixing of an acid and base could result in a neutral solution where this is desirable. Another example would include a blend of poly(lactic acid) and boric oxide.

In choosing the appropriate degradable material, one should consider the degradation products that will result. These degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and poly(lactides) have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

A preferable result is achieved if the degradable material degrades slowly over time as opposed to instantaneously. Even more preferable results have been obtained when the degradable material does not begin to degrade until after the resin composition has substantially cured. The slow degradation of the degradable material, inter alia, helps to maintain the stability of the cured resin mass. In preferred embodiments, the degradable material does not degrade from or out of the resin mass until the resin is at least about 90% cured.

The specific features of the degradable material may be chosen or modified to provide the consolidated resin mass with optimum conductivity while maintaining its desirable filtering capability. The physical shape of the degradable material should be chosen so as to enhance the desired shape and relative composition of the resultant voids within the resin mass so as to provide the cured resin mass with optimum permeability and conductivity characteristics. For example, a rod-like particle shape may be suitable in applications wherein channel-like voids in the final resin mass are desired. One of ordinary skill in the art, with the benefit of this disclosure, will recognize the specific degradable material and the preferred size and shape for a given application. Preferably, the degradable material is substantially evenly dispersed throughout the resin composition.

The resin compositions of the present invention optionally may comprise a particulate filler material. The filler material may be used as a low cost additive to increase the total volume of the resin composition. The filler material may be chosen to add compressive strength, to achieve a desired density, to provide a cost savings, or all of the above. Fillers chosen for strength may be particularly useful in situations in which the resin compositions of the present invention are used to fill subterranean fractures and must be able to withstand closure stress once the formation is placed on production. Any particulate suitable for use in subterranean applications is suitable for use as the filler in the compositions and methods of the present invention. For instance, sand, nut hulls, bauxite, ceramics, polymeric materials, fly ash, bottom ash, a combination thereof, or the like are suitable. Suitable sizes range from 6 to 325 U.S. mesh. In some embodiments of the present invention, the filler material may be included in the resin composition in the range of from about 1% to about 100% by weight of the other components in the resin composition. The filler material is preferably included in the resin composition in the range of from about 60% to about 80% by weight of the other components in the resin composition. When used, in preferred embodiments, the filler material should be substantially evenly dispersed throughout the resin composition before it is placed into the subterranean formation.

Some embodiments of the present invention provide methods of creating resin compositions comprising the step of combining a resin, a hardening agent, a hydrocarbon diluent, a silane coupling agent, a foaming agent, a compressible gas, and a degradable material to form a substantially uniform mixture.

Other embodiments of the present invention provide methods of controlling the migration of particulates in a subterranean formation comprising the steps of isolating an interval in a subterranean formation; providing a resin composition comprising a resin, a hardening agent, a hydrocarbon diluent, a silane coupling agent, a foaming agent, a compressible gas, and a degradable material; placing the resin composition in or neighboring to at least a portion of the isolated interval; and, allowing the resin to substantially cure and the degradable material to substantially degrade so as to form a permeable, hardened resin mass.

Still other embodiments of the present invention provide methods of at least partially maintaining the integrity of a subterranean fracture comprising the steps of providing a resin composition comprising resin, a hardening agent, a hydrocarbon diluent, a silane coupling agent, a foaming agent, a compressible gas, and a degradable material; placing the resin composition into at least one fracture in a subterranean formation; and, allowing the resin to substantially cure and the degradable material to substantially degrade so as to form a permeable, hardened resin mass.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of controlling the migration of particulates in a subterranean formation comprising:
    isolating a zone in a subterranean formation;
    providing a resin composition comprising a resin, a hardening agent, a hydrocarbon diluent, a silane coupling agent, a foaming agent, a compressible gas, and a hydrolytically degradable material;
    placing the resin composition in at least a portion of the zone; and,
    allowing the resin to substantially cure and the hydrolytically degradable material to substantially degrade so as to form a permeable, hardened resin mass.

2. The method of claim 1 wherein the resin is selected from the group consisting of an epoxy resin, a furan resin, a phenolic resin, a furan/furfuryl alcohol resin, a phenolic/latex resin, a phenol formaldehyde resin, a polyester resin; a hybrid polyester resin; a copolymers polyester resin; a polyurethane resin; a hybrid polyurethane resin; a copolymers polyurethane resin, an acrylate resin, and a combination thereof.

3. The method of claim 1 wherein the hardening agent is selected from the group consisting of an amine, an aromatic amine, a polyamine, an aliphatic amine, a cyclo-aliphatic amine, an amide, a polyamide, 2-ethyl-4-methyl imidazole, 1,1,3-trichlorotrifluoroacetone, and a combination thereof.

4. The method of claim 1 wherein the hardening agent comprises from about 40% to about 60% of the resin composition by weight of the resin therein.

5. The method of claim 1 wherein the hydrocarbon diluent comprises one or more aromatic hydrocarbons.

6. The method of claim 1 wherein the hydrocarbon diluent comprises from about 40% to about 60% of the resin composition by weight of the resin therein.

7. The method of claim 1 wherein the silane coupling agent is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane, and a combination thereof.

8. The method of claim 1 wherein the silane coupling agent comprises from about 0.01% to about 5% of the resin composition by weight of the resin therein.

9. The method of claim 1 wherein the foaming agent is selected from the group consisting of a fluorinated alkyl alkoxylate, a fluorinated alkyl ester, a fluorinated aliphatic polymeric ester, and a combination thereof.

10. The method of claim 1 wherein the foaming agent comprises from about 0.01% to about 5% of the resin composition by weight of the resin therein.

11. The method of claim 1 wherein the compressible gas is selected from the group consisting of air, nitrogen, and a combination thereof.

12. The method of claim 1 wherein the compressible gas comprises from about 6 to about 12 pounds per gallon of the resin composition by weight of the sum of all the other components in the resin composition.

13. The method of claim 1 wherein the hydrolytically degradable material is selected from the group consisting of a hydrolytically degradable polymer, a dehydrated salt, and a combination thereof.

14. The method of claim 1 wherein the hydrolytically degradable material comprises from about 1% to about 60% of the resin composition by weight of the resin therein.

15. The method of claim 1 further comprising a filler material.

16. The method of claim 15 wherein the filler material is selected from the group consisting of sand, nut hulls, bauxite, ceramics, polymeric materials, fly ash, bottom ash, and a combination thereof.

17. The method of claim 15 wherein the filler comprises from about 1% to about 60% of the resin composition by weight of the resin therein.

18. A method of at least partially maintaining the integrity of a subterranean fracture comprising:
    providing a resin composition comprising resin, a hardening agent, a hydrocarbon diluent, a silane coupling agent, a foaming agent, a compressible gas, and a hydrolytically degradable material;
    placing the resin composition into at least one fracture in a subterranean formation; and,
    allowing the resin to substantially cure and the hydrolytically degradable material to substantially degrade so as to form a permeable, hardened resin mass.

19. The method of claim 18 wherein the resin is selected from the group consisting of an epoxy resin, a furan resin, a phenolic resin, a furan/furfuryl alcohol resin, a phenolic/latex resin, a phenol formaldehyde resin, a polyester resin; a hybrid polyester resin; a copolymers polyester resin; a polyurethane resin; a hybrid polyurethane resin; a copolymers polyurethane resin, an acrylate resin, and a combination thereof.

20. The method of claim 18 wherein the hardening agent is selected from the group consisting of an amine, an aromatic amine, a polyamine, an aliphatic amine, a cyclo-aliphatic amine, an amide, a polyamide, 2-ethyl-4-methyl imidazole, 1,1,3-trichlorotrifluoroacetone, and a combination thereof.

21. The method of claim 18 wherein the hardening agent comprises from about 40% to about 60% of the resin composition by weight of the resin therein.

22. The method of claim 18 wherein the hydrocarbon diluent comprises one or more aromatic hydrocarbons.

23. The method of claim 18 wherein the hydrocarbon diluent comprises from about 40% to about 60% of the resin composition by weight of the resin therein.

24. The method of claim 18 wherein the silane coupling agent is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane, and a combination thereof.

25. The method of claim 18 wherein the silane coupling agent comprises from about 0.01% to about 5% of the resin composition by weight of the resin therein.

26. The method of claim 18 wherein the foaming agent is selected from the group consisting of a fluorinated alkyl alkoxylate, a fluorinated alkyl ester, a fluorinated aliphatic polymeric ester, and a combination thereof.

27. The method of claim 18 wherein the foaming agent comprises from about 0.01% to about 5% of the resin composition by weight of the resin therein.

28. The method of claim 18 wherein the compressible gas is selected from the group consisting of air, nitrogen, and a combination thereof.

29. The method of claim 18 wherein the compressible gas comprises from about 6 to about 12 pounds per gallon of the resin composition by weight of the sum of all the other components in the resin composition.

30. The method of claim 18 wherein the hydrolytically degradable material is selected from the group consisting of a hydrolytically degradable polymer, a dehydrated salt, and a combination thereof.

31. The method of claim 18 wherein the hydrolytically degradable material comprises from about 1% to about 60% of the resin composition by weight of the resin therein.

32. The method of claim 18 further comprising a filler material.

33. The method of claim 32 wherein the filler material is selected from the group consisting of sand, nut hulls, bauxite, ceramics, polymeric materials, fly ash, bottom ash, and a combination thereof.

34. The method of claim 32 wherein the filler comprises from about 1% to about 60% of the resin composition by weight of the resin therein.

35. The method of claim 1 further comprising a material that degrades when subjected to a subterranean formation temperature.

36. The method of claim 18 further comprising a material that degrades when subjected to a subterranean formation temperature.

* * * * *